(12) United States Patent
Robinson et al.

(10) Patent No.: US 10,116,693 B1
(45) Date of Patent: Oct. 30, 2018

(54) SERVER USING PROOF-OF-WORK TECHNIQUE FOR HARDENING AGAINST DENIAL OF SERVICE ATTACKS

(71) Applicant: EMC IP Holding Company LLC, Hopkinton, MA (US)

(72) Inventors: Peter Alan Robinson, Enoggera Reservoir (AU); Eric Young, Annerley (AU)

(73) Assignee: EMC IP Holding Company LLC, Hopkinton, MA (US)

( * ) Notice: Subject to any disclaimer, the term of this patent is extended or adjusted under 35 U.S.C. 154(b) by 187 days.

(21) Appl. No.: 15/194,679

(22) Filed: Jun. 28, 2016

(51) Int. Cl.
*H04L 29/06* (2006.01)
*G06F 17/30* (2006.01)
*G06F 9/455* (2018.01)
*H04L 9/06* (2006.01)

(52) U.S. Cl.
CPC ...... *H04L 63/1458* (2013.01); *G06F 9/45558* (2013.01); *G06F 17/3033* (2013.01); *G06F 17/30575* (2013.01); *H04L 9/0643* (2013.01); *H04L 67/42* (2013.01); *G06F 2009/4557* (2013.01)

(58) Field of Classification Search
CPC ... H04L 63/1458; H04L 9/0643; H04L 67/42; G06F 9/45558; G06F 17/3033; G06F 17/30575; G06F 2009/4557
See application file for complete search history.

(56) References Cited

U.S. PATENT DOCUMENTS

| | | | |
|---|---|---|---|
| 9,807,092 B1* | 10/2017 | Gutzmann | H04L 63/1458 |
| 2010/0031315 A1* | 2/2010 | Feng | G06F 21/554 |
| | | | 726/3 |
| 2016/0173529 A1* | 6/2016 | Baig | H04L 63/1458 |
| | | | 726/13 |
| 2016/0301531 A1* | 10/2016 | Finlow-Bates | G06F 21/33 |

OTHER PUBLICATIONS

Juels et al., "Client Puzzles: A Cryptographic Countermeasure Against Connection Depletion Attacks", Internet Society, Proceedings of 1999 Network and Distributed System Security Symposium, 1999.
Abadi et al., "Moderately Hard, Memory-bound Functions", ACM Transcript on Internet Technology, May 2005.
"Client Puzzle Protocol", Wikipedia, Mar. 2013.

* cited by examiner

*Primary Examiner* — Kendall Dolly
(74) *Attorney, Agent, or Firm* — BainwoodHuang

(57) ABSTRACT

A computerized device and a process protect against denial-of-service (DoS) attacks by using a memory-time hard problem that a client (e.g., IoT device or mobile app) solves as part of a request such as an initial registration process. The process may use parameters obtained from a public source of randomness. The problem is designed such that all memory allocated for the algorithm is used in a random manner, making it difficult for attackers to use FPGA/ASIC approaches. The client provides a proof-of-work (PoW) value to a server, which performs a more directed version of the calculation done by the client to confirm that the PoW value is correct. When confirmation is not obtained, the server can refrain from further processing of the client request, thwarting DoS attacks.

19 Claims, 3 Drawing Sheets

```
CLIENT 12                           SERVER 10

S1: GENERATE RandArray

S2: EACH SvrTime:
                                        OBTAIN/GENERATE    ← — ►  (PRS 40)
                                        SvrRandom C1: GENERATE RandArray C2: OBTAIN SvrTime,      ← — ►  (PRS 40)
    SvrRandom C3: PERFORM CLIENT PoW
    CALCULATION AND SEND
    PARAMS/RESULTS TO SERVER
                                    S3: VERIFY PARAMS, PERFORM
                                        SERVER PoW CALCULATION AS
                                        CONDITION TO PROCEEDING WITH
                                        CLIENT REGISTRATION
```

SERVER USING PROOF-OF-WORK TECHNIQUE FOR HARDENING AGAINST DENIAL OF SERVICE ATTACKS

BACKGROUND

The present invention is related to computer security, and more specifically related to protection of computer systems against denial-of-service (DoS) attacks.

ISO Layer 7 (Application Layer) DoS Attacks are attacks against servers in which an attacker imitates a valid application workflow, and aims to make the server unavailable by flooding the server with requests. Servers are vulnerable to this type of attack when users of the service are not yet authenticated, such as during a registration process. A feature of Layer 7 DoS attacks is asymmetric work loading. Attackers aim to do little work in order to cause the server to perform many operations. A DoS attack may be launched from a single machine/connection or from a collection of different machines/connections, in which case the DoS attack is commonly referred to as a "distributed" denial-of-service (DDoS) attack.

An example of a Layer 7 DoS attack is as follows. An attacker emulates a registration workflow of a device, such as an Internet of Things (IoT) device, in which the device sends a device id encrypted with a server RSA key. The attacker only has to do a relatively low-effort RSA public key operation, while the server has to perform a relatively expensive RSA private key operation plus perform database look-ups prior to determining that the device id is invalid and discarding the request. In this way, the attacker is able to flood the IoT device registration process.

Another example is mobile app registration. No user authentication occurs early in the registration process. Thus an attacker can perform small amounts of work on the client side (issuing apparently valid registration requests) to result in large amounts of work on the server side (processing the requests up to a point of identifying the user as not authorized, etc.).

It is known to use so-called "puzzle" approaches as an aid in thwarting or reducing the impact of DoS attacks. A server responds to an initial request by first requiring the requestor to perform a non-trivial calculation. Only when a requestor provides evidence of having performed the calculation correctly ("solving the puzzle") does the server take further action on the request. Because the requestor is forced to perform work as a condition to the server processing the request, the desired effect of flooding the server with work is not obtained.

SUMMARY

A computerized device and a process are disclosed that protect against DoS attacks by using a memory-time hard problem that a client (e.g., IoT device or mobile app) solves as part of a request such as an initial registration process. The process may use parameters obtained from a public source of randomness. The problem is designed such that all memory allocated for the algorithm is used in a random manner, making it difficult for attackers to use FPGA/ASIC approaches. The client provides a proof-of-work (PoW) value to a server, which performs a more directed version of the calculation done by the client in order to confirm that the PoW value is correct. Auto-synchronization may be used between VMs in a cluster of servers to reduce the load on backend databases.

More particularly, a method disclosed for operating a computer system including a client and a server. The client performs client operations including:

generating an array of hash values by iterating first cryptographic hashing operations, each operation generating a respective hash value of the array and taking as input a respective hash value of the array generated by a respective preceding operation;

performing searches of the array until a stop condition is reached, each search beginning with a last-generated hash value of the array and including iterated second cryptographic hashing operations, each operation taking as inputs (1) a search count value and (2) a respective intermediate value generated in a respective preceding operation, the search count value being incremented to count the number of searches performed, the stop condition being that a last-generated intermediate value of a final search is equal to a predetermined stop value; and in connection with a client request to a server device, sending the search count value of the final search as a proof-of-work value to the server device.

The server performs server operations including:

generating the array of hash values by iterating the first cryptographic hashing operations;

receiving the client request containing the proof-of-work value;

performing one search of the array beginning with the last-generated hash value of the array and including iterated third cryptographic hashing operations, each operation taking as inputs (1) the proof-of-work value received from the client device, and (2) a respective intermediate value generated in a respective preceding operation;

comparing a last-generated intermediate value of the one search to the predetermined stop value to generate a verification result; and when the verification result is positive, then performing further processing of the client request, and when the verification result is negative, then refraining from the further processing of the client request.

The disclosed methods and apparatus may have advantages over known puzzle-solving techniques, including for example memory hardness (increasing hardware costs for attackers) and optionally using public randomness as an approach to single-pass proof of work. The technique may be enhanced by using large RSA private key operations as part of the puzzle. A combination challenge seed can be used to have an auto-synchronized back end, so a set of servers need not access a database to create a challenge or verify a challenge.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
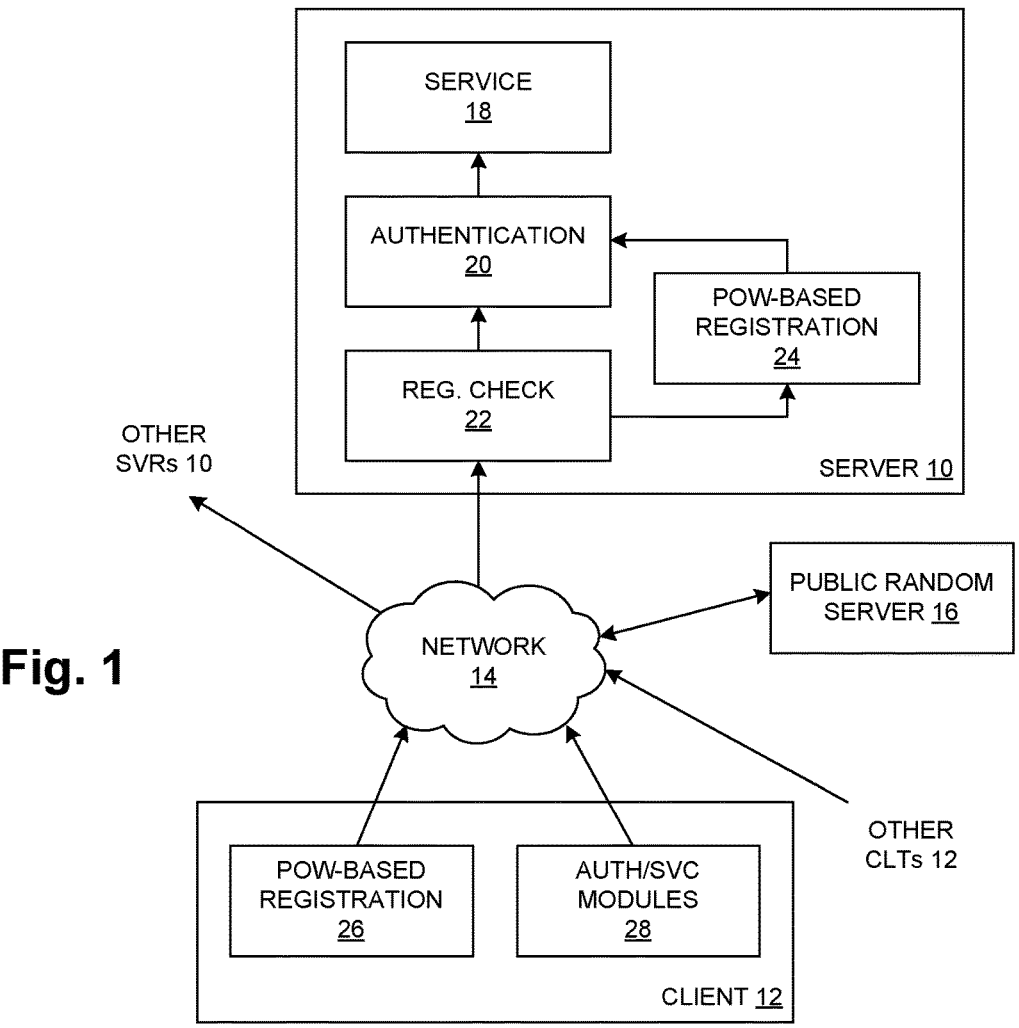
FIG. 1 is a block diagram of a computer system.

FIG. 1 shows a computer system having one or more server computers or servers (SVRs) 10 and client computers or clients (CLTs) 12 coupled together by a network 14. Also connected to the network 14 may be a public random server 16. A server 10 provides one or more computing services to the clients 12 using functional components, which are shown as a service application or service 18, authentication 20, registration checking 22 and proof-of-work (PoW)-based registration 24 in FIG. 1. A client 12 includes functional components shown as PoW-based registration 26 and authentication/service (AUTH/SVC) 28.

The various functional components in FIG. 1 may be realized by execution of respective computer programs. Thus the service 18, for example, may be realized by execution of one or more service application programs by the server 10. Example services 18 include financial services (e.g., online banking), e-commerce, etc. A client 12 may be any of a variety of devices/applications, including an IoT device, a PC, a mobile device or an app executing on a mobile device, etc. In the present description it is assumed that the client 12 is a machine/app via which a user accesses a service 18. In alternative embodiments, e.g., when the client 12 is an IoT or similar smart device, the specific organization of the server 10 might differ, to accommodate different workflows of such devices.

In operation of the illustrated system, a human user accesses or invokes a service 18 using a client 12. In a typical example, a user employs a Web browser or other app that can locate and then interact with the components of the server 10. In the present description, an example is used that includes three successive phases of interaction, namely registration, authentication, and service delivery. It will be appreciated that other specific types of interactions may occur in other use cases, while still potentially benefiting from the techniques described herein.

More specifically, the phases of interaction are as follows:

1. Registration

An unregistered user requests to be registered to obtain the service. At the server 10, registration typically involves soliciting, receiving, and recording user information in an "account" or analogous persistent record. Typically authentication information is also recorded, such as a password, etc. There may also be recording of parameters of the service delivery, e.g., user preferences, any specific privileges or limitations, etc. Registration can also include checking for a user's basic ability to use the service. For example, a request to create an online-banking computer account might only be granted when a user can identify at least one financial account (e.g., checking account) that the user holds at the bank. If a user cannot identify such an existing account, then the registration process will terminate with the user request for registration being denied.

2. Authentication

Authentication occurs in connection with a user request to use the service 18. The registration checking component 22 checks whether the user is registered, and if so then passes the request to the authentication component 20. Authentication component 20 accesses the previously created registration record to obtain authentication-related information, e.g. the registered password that will be compared against a password presented in connection with the request to use the service. If no registration record exists for a requesting user, which might be the case during an attack for example, the registration checking 22 fails and a suitable indication may be returned to the requesting user.

3. Service Delivery

Once a registered user is authenticated, then the user is permitted to engage with the service 18. Continuing with the banking example, a user request to view a financial account is processed to obtain the account information and display it to the user. In another example, a user might initiate a transaction, such as a purchase or payment, and that transaction is processed as far as possible (e.g., to completion).

The registration component 24 employs a "proof of work" (PoW) process in connection with registration. As outlined above, this process forces a client 12 to perform non-trivial activity as a condition to proceeding further with registration, to thwart DoS attacks that rely on asymmetrical loading in favor of the client. Details of the PoW process are provided below.

The server 10 may be part of a set of closely coupled servers 10 termed a "cluster", in which case they may share a variety of environment data, access to records or databases, etc. The servers 10 may employ auto-synchronization between virtual machines (VMs) in a cluster to reduce the load on backend databases.

Figure 2:
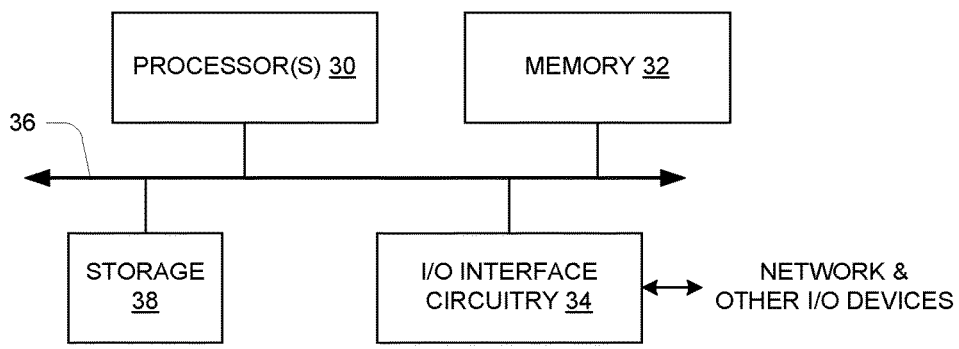
FIG. 2 is a block diagram of a computer from a hardware perspective.

FIG. 2 shows an example configuration of a physical computer such as a server 10 or client 12 from a computer hardware perspective. The hardware includes one or more processors 30, memory 32, and interface circuitry 34 interconnected by data interconnections 36 such as one or more high-speed data buses. The interface circuitry 34 provides a hardware connection to the network 14 (FIG. 1) and perhaps other external devices/connections (EXT DEVs). The processor(s) 30 with connected memory 32 may also be referred to as "processing circuitry" herein. There may also be local storage 38 such as a local-attached disk drive or Flash drive. In operation, the memory 32 stores data and instructions of system software (e.g., operating system) and one or more application programs that are executed by the processor(s) 30 to cause the hardware to function in a software-defined manner. Thus the computer hardware executing instructions of a registration application, for example, can be referred to as a registration circuit or registration component, and it will be understood that a collection of such circuits or components can all be realized and interact with each other as one or more sets of computer processing hardware executing different computer programs as generally known in the art. Further, the application software may be stored on a non-transitory computer-readable medium such as an optical or magnetic disk, Flash memory or other non-volatile semiconductor memory, etc., from which it is retrieved for execution by the processing circuitry, as also generally known in the art.

Figure 3:
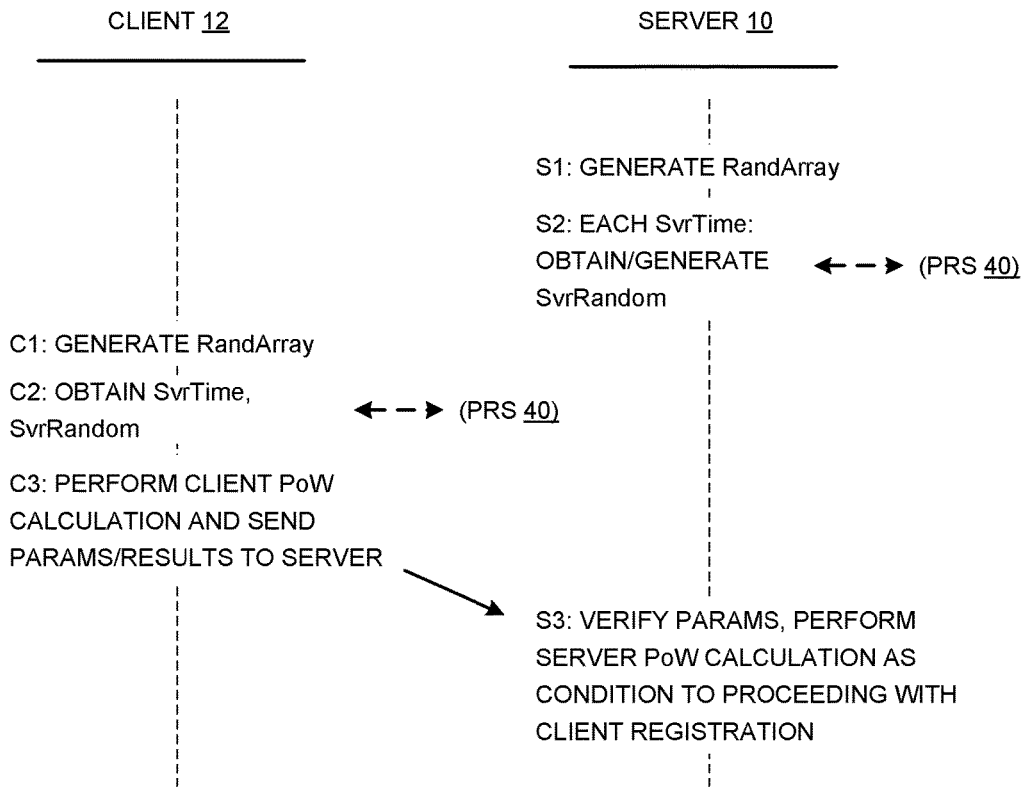
FIG. 3 is a flow diagram of a proof-of-work (PoW) based registration process.

FIG. 3 depicts the proof of work process at a high level, showing respective operations by a client 12 and server 10 over a period of time, which progresses downwardly in the Figure. Respective operations of the client 12 and server 10 are identified by numbers with respective C or S prefixes, e.g., C1, C2, S1, S2, etc.

Initially the server 10 performs operation S1 in which it generates an array of cryptographic hash values referred to as RandArray. In one example this is done by iterated message digest (MD) operations starting with a seed value, as described more below. Then at regular intervals denoted SvrTime, the server 10 either generates or otherwise obtains a corresponding random value referred to as SvrRandom. In one embodiment the server 10 contacts a "public random server" or PRS 40 for this purpose. Additional detail regarding the public random server (also referred to as a "beacon" herein) and its use are provided below. SvrTime is a time stamp in appropriate units, e.g., one second increments.

The client 12 performs steps C1-C3 in connection with a request sent to the server 10, e.g., a registration request as described above. In operation C1 the client 12 generates the same RandArray, and in operation C2 the client 12 obtains the current SvrTime and SvrRandom. The client 12 may obtain these values from the server 10 and/or the PRS 40. In operation C3 the client 12 uses RandArray, SvrTime and SvrRandom to perform a client proof-of-work (PoW) calculation and then sends both the parameters and results of the PoW calculation to the server 10.

The server 10 responds by performing operation S3 in which it verifies correctness of the parameters and performs a server PoW calculation in order to verify the correctness of the client PoW calculation, and thereby confirm that the client 12 actually performed that calculation. If this verification succeeds, then the server 10 can proceed with the registration or other request that the client 12 is making. Otherwise, the server 10 may refrain from processing the request, on the assumption that the client 12 may be engaging in a DoS attack or is otherwise illegitimate.

Figure 4:
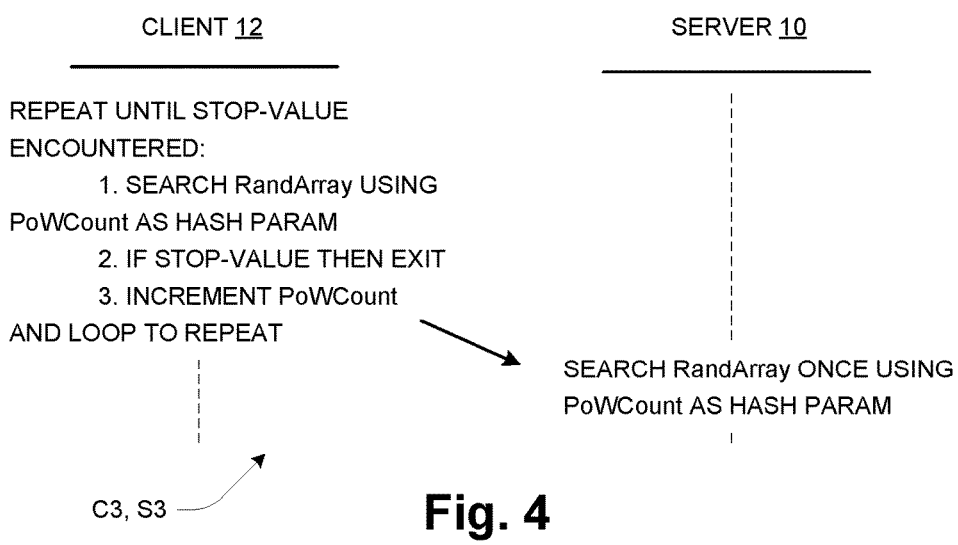
FIG. 4 is a flow diagram of PoW calculations.

FIG. 4 provides some additional detail regarding the PoW calculations of operations C3 and S3. At the client 12, the calculation requires an iteration of a search of RandArray until a stop-value is encountered. In general, multiple iterations will be required, and the number of iterations is tracked as a PoWCount. Once the stop-value is encountered, the current PoWCount is sent to the server 10. The server 10 in performing operation S3 uses PoWCount to perform only one search of RandArray. If this one search yields the stop-value, it confirms that the client 12 performed the client PoW calculation, and if not then it indicates that the client 12 did not perform the client PoW calculation.

Figure 5:
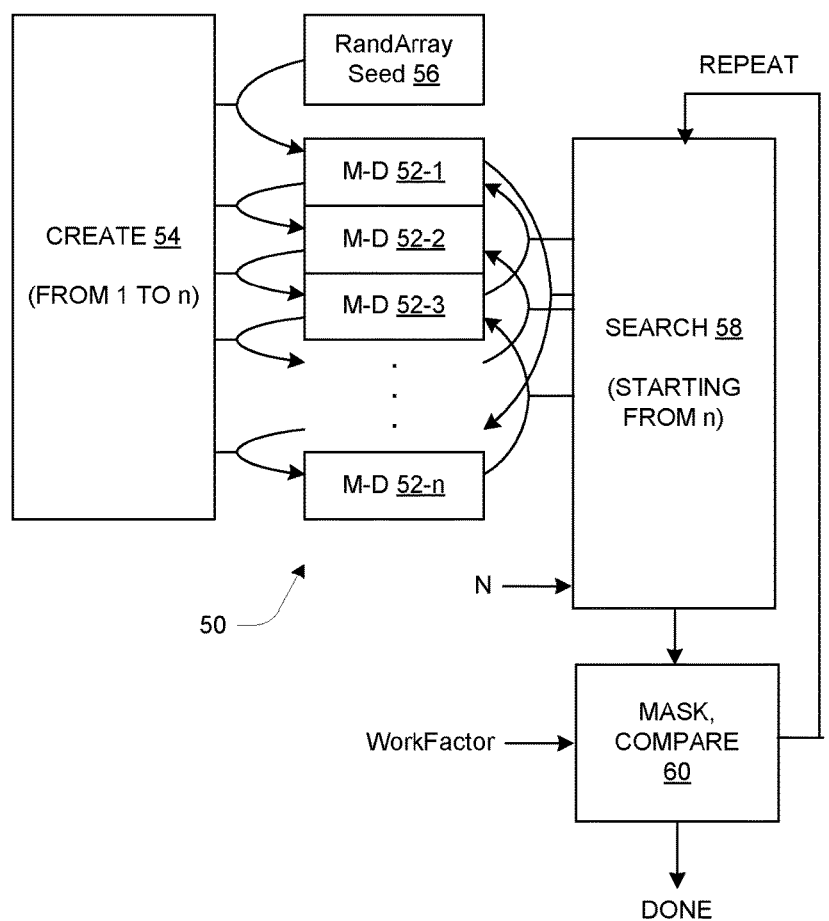
FIG. 5 is a schematic diagram of an array of random values, along with creation and use logic, as used in PoW calculations.

FIG. 5 shows the structure, creation and use of RandArray 50. Structurally, it is an array of message digests (MDs) 52 or other cryptographic hash values, indexed from 1 to n as shown, where $n=2^N$. The creation process 54 involves iteratively creating each successive MD 52 from its immediate predecessor (i.e., MD 52-3 is created from MD 52-2, etc.), with the first MD 52-1 being created from a seed value RandArraySeed 56. In the illustrated embodiment each iteration utilizes a message digest (MD) calculation, such as MD5 for example, but in other embodiments some other type of cryptographic hash function may be used. The resulting RandArray 50 is an array of random values having been created in a deterministic, and thus repeatable, manner. Both the client 12 and server 10 can independently create RandArray 50 from a common RandArraySeed value 56.

RandArray 50 is used by a search process 58. Each search begins with the last MD 52-n and progresses to others, iteratively and randomly, as described in more detail below. This approach of creating the array in one direction (1 to n) and searching it starting at the far end (element n) enhances what is referred to as "memory hardness" of the calculation. It requires that the client 12 have created and stored the entire RandArray 50, forcing an attacker to devote memory and processing resources for that purpose. As noted above, the search is iterated at the client 12 and performed once at the server 10. Iteration is controlled by a masking and comparing operation 60, also described more below.

A more detailed and formal description of the PoW calculations is now presented. In this description, the following variable names are used:
WorkFactor: A parameter indicating the amount of work the client 12 must do, by determining the size of a mask value used in checking for the stop value. The stop mask is calculated as $(2^{WorkFactor}-1)$.

PoWCount: A count value used in the PoW calculation and passed from client 12 to server 10 to prove to the server that the client has completed the calculation.

PoWSearch: A parameter specifying the number of times that RandArray must be looked up for each search, and thus directly related to the amount of work that is done. It may be on the order of 5 or greater.

RandArray, N: RandArray is an array of random numbers generated deterministically.
The array has $n=2^N$ elements, where each element is a message digest or other hash value.

RandArraySeed: A value used as the seed value from which the RandArray is generated. The value is shared between the clients 12 and servers 10, so that they generate the same RandArray.

SvrRandom and SvrTime: A random number and a timestamp value generated by either a trusted public random service (PRS 40) or by the server 10. For the server case, SvrRandom may be based on a server seed (referred to as SvrSeed) and SvrTime.

As noted above, a client could be any of a variety of devices/entities seeking use of a service, such as a mobile device, an Internet Of Things (IoT) device, a virtual machine, a computer, any computing device.

Also, in the PoW calculation alternatives to message digest may be used, including symmetric cipher, HMAC, Key Derivation Function, pseudo-random number generator (PRNG), etc.

Initially, the client 12 and server 10 store the following values, which may be provided by configuration or other techniques:
RandArraySeed
PoWSearch
N (size of RandArray)

The servers 10 each create RandArray. An example way of doing this is to apply a message digest function to RandArraySeed to create a first value for the array, then apply message digest to the first value to create a second, etc. until value n is created. A suitably large array size is desired so as to occupy a desired amount of memory, e.g., 1 MByte of RAM. The size is preferably a power of 2, allowing for a masked value to be used as an address/index.

Below is a more formal definition of the creation process 54:
RandArray is an array of elements, where each element is a message digest
RandArray has n elements, where $n=2^N$
RandArray[1]=Message Digest (RandArraySeed)
For (index=2; index≤n; index++) {
RandArray[index]=MessageDigest(RandArray[index−1]
}

The client 12 also creates RandArray using the same RandArraySeed value. The client 12 also has or generates a unique ClientId that is tied to the client device (e.g., mobile device, computer, etc.).

Optionally, the client 12 can go to a public trusted source of randomness (PRS 40) to obtain SvrRandom. An example of the PRS 40 is the NIST randomness beacon reachable at URL (https<colon><slash><slash>beacon<dot>nist<dot>gov<slash>home). The client 12 records the timestamp SvrTime associated with SvrRandom. Note that in this embodiment, the server 10 also fetches SvrRandom and SvrTime values as they are generated by the trusted source of randomness.

Optionally, the client 12 goes to the server 10 to get a challenge. The challenge is created using a SvrSeed value that is shared among all servers of a cluster, and the SvrTime value. In this case, SvrRandom is generated on the server 10. It is calculated as SvrRandom=message digest(ServerSeed, SvrTime). The server 10 returns the current values of SvrRandom and SvrTime to the client 12. All servers 10 can calculate SvrRandom and are synchronized internally by virtue of them having access to ServerSeed and synchronized clocks.

Optionally, the server 10 can have a set of large RSA key pairs. The key size could be 16,384 bit keys, for example. The server 10 delivers one of the RSA private keys to the client 12 for use in signing a PoWCount value as described below.

The client 12 performs the client PoW calculation as follows:
1. Initially set PoWCount to zero
2. Loop on the following:
    i. Calculate IntermediateValue=message digest(ClientId, SvrRandom, PoWCount, RandArray[n])
    ii. For PoWSearch number of times:
        Mask the lowest N bits of IntermediateValue and call the result offset1
        Calculate IntermediateValue=message digest(RandArray[offset1])
        Check whether the lowest WorkFactor number of bits of IntermediateValue are equal to the stop-value, e.g., zero. If they are not, then increment PoWCount and continue looping; otherwise exit the loop
3. Deliver the following to the server 10: ClientId, SvrRandom, SvrTime, PoWCount
    If the RSA key pair option is being used, the client 12 signs this collection of information and sends the signed collection to the server 10.

In the above, zero is used as the stop value. It will be appreciated that an alternative stop value may be used. Given the randomness of the MDs 52 of RandArray, the lowest bits of IntermediateValue take on all values with approximately equal likelihood, so any value should result in the same expected number of searches of RandArray.

The server 10 checks the ClientID to ensure the client 12 has not previously been registered. A memory cache of these values could be held to further strengthen the service against attack (avoiding need to access separate database). The server 10 also verifies SvrTime and SvrRandom as a function of SvrTime.

The server 10 then verifies PoWCount by performing the server PoW calculation. This is one pass of the same operations 2(*i*) and 2(*ii*) above, using the PoWCount provided by the client 12. If the client 12 performed the client PoW calculation, then this one search/pass through RandArray should yield the stop-value (zero in this case). In this case, there is confidence that the current client request is not part of a DoS attack, and can be further processed by the server 10. If the one search/pass does not yield the stop-value, it indicates that the PoWCount value is incorrect, suggesting that the client 12 did not actually perform the PoW calculation and that the request may be part of a DoS attack. In this case, the server 10 refrains from further processing of the client request.

The following are general advantages of the disclosed technique:
    Using public randomness allows clients to do all calculations without accessing the server: this is a single pass approach that can be verified.
    The public randomness and/or server challenge are time based, giving timeliness.
    Using a large RSA key pair with the private key operation on the client side weights computation workload towards the client (potential attacker).
    The PoWSearch variable forces the client/attacker to keep RandArray in memory. This means that the algorithm is a "memory hard".
    The client could obtain the various parameters, WorkFactor, N, PoWSearch, and RandArraySeed values, from the server at the start of the process. In this case the server could, from time to time, change the values of these variables.
        Changing N would alter the amount of memory that the client/attacker would need to use to register.
        WorkFactor and PoWSearch changes how computationally intensive the process is.
        Changing the RandArraySeed means that a new RandArray would be generated. In this case, all server instances also need to generate this array.

The following shows the work calculations for the client, server, and an attacker, illustrating how much extra work an attacker must do when attacking a server.

Client Work:
    Generate RandArray by performing $2^N$ message digests.
    Access either the server to request SvrSeed and SvrTime, or access the public randomness beacon to request SvrRandom and SvrTime.
    Generate a ClientId
    Perform on average (($2^{WorkFactor-1}$×PoWSearch)+1) message digests
    Optionally sign the request.
    Send the results to the server.

Attacker Work:
    Pre-calculate once:
        Generate RandArray by doing $2^N$ message digests.
    As necessary (e.g., at time stamp intervals):
        Access either the server to request SvrSeed and SvrTime, or access the public randomness beacon to obtain SvrRandom and SvrTime.
    For each registration request:
        Generate a ClientId
        Perform on average (($2^{WorkFactor-1}$×PoWSearch)+1) message digests
        Optionally sign the request.
        Send the results to the server.

Server Work:
    Pre-calculate once:
        Generate RandArray by doing $2^N$ message digests.
    At time stamp intervals:
        Calculate SvrSeed and SvrTime, or access the public randomness beacon to request SvrRandom and SvrTime.
    For each registration request:
        Check whether ClientId has already been used.
        Perform (PoWSearch+1) message digests
        Optionally verify the request.

While various embodiments of the invention have been particularly shown and described, it will be understood by those skilled in the art that various changes in form and details may be made therein without departing from the scope of the invention as defined by the appended claims.

What is claimed is:

1. A method of operating a server device in connection with a human interaction service provided to client devices, comprising:
    generating, by the server device, an array of hash values by iterating first cryptographic hashing operations, each operation generating a respective hash value of the array and taking as input a respective preceding hash value of the array generated by a respective preceding operation;

receiving, by the server device, a client request containing a proof-of-work value, the proof-of-work value reflecting a count of multiple searches of the same array of hash values at the client device until encountering a predetermined stop value in the array;

performing, by the server device, one search of the array beginning with the last-generated hash value, the one search including iterated second cryptographic hashing operations each taking as inputs (1) the proof-of-work value received from the client device, and (2) a respective intermediate value generated in a respective preceding operation;

comparing, by the server device, a last-generated intermediate value of the one search to the predetermined stop value to generate a verification result; and when the verification result is positive, then performing further processing of the client request by the server device to provide the human interaction service to a client device that provided the client request, and when the verification result is negative, then refraining from the further processing of the client request;

wherein each of the second cryptographic hashing operations includes generating a respective index to be used to select a hash value of the array in a next succeeding operation, the index being generated by masking a predetermined number of bits of a respective hash value retrieved by the operation, the predetermined number corresponding to an address length for the array.

2. The method of claim 1, wherein the intermediate value is generated for each second cryptographic hashing operation by masking a predetermined number of bits of a respective hash value retrieved by the operation.

3. The method of claim 2, wherein the predetermined number is determined by an explicit work factor parameter provided to the server and the client devices.

4. The method of claim 1, wherein the service is provided based on prior authentication of registered client devices authorized to use the service, and wherein the client request is a registration request seeking registration of a non-authenticated client to use the service.

5. The method of claim 1, wherein the server is part of a cluster of closely coupled servers sharing environment data and access to records or databases, and wherein the servers employ auto-synchronization between virtual machines (VMs) in a cluster to reduce a load on the records or databases.

6. The method of claim 1, wherein the first and second cryptographic hashing operations are respective first and second message digest operations, and wherein an initial one of the first message digest operations operates on a predetermined seed value to generate a first hash value of the array.

7. The method of claim 1, wherein each of the searches is a predetermined number of the iterated second hashing operations, the predetermined number established by an explicit search parameter provided to the server and to the client devices.

8. The method of claim 1, wherein the verification result is positive; and
wherein the performing further processing of the client request includes:
in response to the verification result that is positive, delivering the human interaction service from the server device to the client device through a network the human interaction service including at least one of a registration service, an authentication service, and a user-level service.

9. A method of operating a server device in connection with a human interaction service provided to client devices, comprising:

generating, by the server device, an array of hash values by iterating first cryptographic hashing operations, each operation generating a respective hash value of the array and taking as input a respective preceding hash value of the array generated by a respective preceding operation;

receiving, by the server device, a client request containing a proof-of-work value, the proof-of-work value reflecting a count of multiple searches of the same array of hash values at the client device until encountering a predetermined stop value in the array;

performing, by the server device, one search of the array beginning with the last-generated hash value, the one search including iterated second cryptographic hashing operations each taking as inputs (1) the proof-of-work value received from the client device, and (2) a respective intermediate value generated in a respective preceding operation;

comparing, by the server device, a last-generated intermediate value of the one search to the predetermined stop value to generate a verification result; and when the verification result is positive, then performing further processing of the client request by the server device to provide the human interaction service to a client device that provided the client request, and when the verification result is negative, then refraining from the further processing of the client request;

wherein the first and second cryptographic hashing operations are respective first and second message digest operations, and wherein an initial one of the first message digest operations operates on a predetermined seed value to generate a first hash value of the array; and wherein the second message digest operations takes as an additional input a server random value, the server random value being one of a stream of server random values generated uniquely for the server at respective server times identified by respective server time values.

10. The method of claim 9, further including receiving the server time value with the client request and using the server time value to identify the server random value to be used in the second message digest operations.

11. The method of claim 9, further including obtaining the server random value from a trusted public source of randomness.

12. A method of operating a client device in connection with a human interaction service provided by a server device, comprising:

generating, by the client device, an array of hash values by iterating first cryptographic hashing operations, each operation generating a respective hash value of the array and taking as input a respective hash value of the array generated by a respective preceding operation;

performing, by the client device, searches of the array until a stop condition is reached, each search beginning with a last-generated hash value of the array and including iterated second cryptographic hashing operations, each operation taking as inputs (1) a search count value and (2) a respective intermediate value generated in a respective preceding operation, the search count value being incremented to count the number of searches performed, the stop condition being that a last-generated intermediate value of a final search is equal to a predetermined stop value; and in connection with a client request to the server device, sending, by the client device, the search count value of the final search as a proof-of-work value to the server device to indicate that the client device has performed the method and obtain the human interaction service from the server device;

wherein each of the second cryptographic hashing operations includes generating a respective index to be used to select a hash value of the array in a next succeeding operation, the index being generated by masking a predetermined number of bits of a respective hash value retrieved by the operation, the predetermined number corresponding to an address length for the array.

13. The method of claim 12, wherein the intermediate value is generated for each second cryptographic hashing operation by masking a predetermined number of bits of a respective hash value retrieved by the operation.

14. The method of claim 12, wherein the service is provided based on prior authentication of registered client devices authorized to use the service, and wherein the client request is a registration request seeking registration of a non-authenticated client to use the service.

15. The method of claim 12, wherein the first and second cryptographic hashing operations are respective first and second message digest operations, and wherein an initial one of the first message digest operations operates on a predetermined seed value to generate a first hash value of the array.

16. The method of claim 12, wherein each of the searches is a predetermined number of the iterated second hashing operations, the predetermined number established by an explicit search parameter provided to the server and to the client devices.

17. A method of operating a client device in connection with a human interaction service provided by a server device, comprising:

generating, by the client device, an array of hash values by iterating first cryptographic hashing operations, each operation generating a respective hash value of the array and taking as input a respective hash value of the array generated by a respective preceding operation;

performing, by the client device, searches of the array until a stop condition is reached, each search beginning with a last-generated hash value of the array and including iterated second cryptographic hashing operations, each operation taking as inputs (1) a search count value and (2) a respective intermediate value generated in a respective preceding operation, the search count value being incremented to count the number of searches performed, the stop condition being that a last-generated intermediate value of a final search is equal to a predetermined stop value; and in connection with a client request to the server device, sending, by the client device, the search count value of the final search as a proof-of-work value to the server device to indicate that the client device has performed the method and obtain the human interaction service from the server device;

wherein the first and second cryptographic hashing operations are respective first and second message digest operations, and wherein an initial one of the first message digest operations operates on a predetermined seed value to generate a first hash value of the array; and wherein the second message digest operations takes as an additional input a server random value, the server random value being one of a stream of server random values generated uniquely for the server at respective server times identified by respective server time values.

18. The method of claim 17, further including obtaining the server time value and server random value from a trusted public source of randomness.

19. A method operating a client device and a server device in connection with a human interaction service provided by the server device, comprising:

A) at a client device:
generating an array of hash values by iterating first cryptographic hashing operations, each operation generating a respective hash value of the array and taking as input a respective hash value of the array generated by a respective preceding operation;

performing searches of the array until a stop condition is reached, each search beginning with a last-generated hash value of the array and including iterated second cryptographic hashing operations, each operation taking as inputs (1) a search count value and (2) a respective intermediate value generated in a respective preceding operation, the search count value being incremented to count the number of searches performed, the stop condition being that a last-generated intermediate value of a final search is equal to a predetermined stop value; and in connection with a client request to a server device, sending the search count value of the final search as a proof-of-work value to the server device to obtain the human interaction service from the server device; and B) at the server device:
gene rating the array of hash values by iterating the first cryptographic hashing operations;

receiving the client request containing the proof-of-work value;

performing one search of the array beginning with the last-generated hash value of the array and including iterated third cryptographic hashing operations, each operation taking as inputs (1) the proof-of-work value received from the client device, and (2) a respective intermediate value generated in a respective preceding operation;

comparing a last-generated intermediate value of the one search to the predetermined stop value to generate a verification result; and when the verification result is positive, then performing further processing of the client request to provide the human interaction service to the client device, and when the verification result is negative, then refraining from the further processing of the client request;

wherein each of the second cryptographic hashing operations includes generating a respective index to be used to select a hash value of the array in a next succeeding operation, the index being generated by masking a predetermined number of bits of a respective hash value retrieved by the operation, the predetermined number corresponding to an address length for the array.

* * * * *